US011044613B2

(12) United States Patent
Lee et al.

(10) Patent No.: US 11,044,613 B2
(45) Date of Patent: Jun. 22, 2021

(54) METHOD OF PROCESSING IMAGE, COMPUTER-READABLE STORAGE MEDIUM RECORDING METHOD, AND APPARATUS FOR PROCESSING IMAGE

(71) Applicant: Samsung Electronics Co., Ltd., Suwon-si (KR)

(72) Inventors: Soonyoung Lee, Suwon-si (KR); Sungbum Park, Suwon-si (KR); Minsung Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 65 days.

(21) Appl. No.: 16/377,978

(22) Filed: Apr. 8, 2019

(65) Prior Publication Data
US 2019/0320327 A1    Oct. 17, 2019

(30) Foreign Application Priority Data
Apr. 13, 2018    (KR) .......................... 10-2018-0043474

(51) Int. Cl.
*G06K 9/00*    (2006.01)
*H04W 16/18*    (2009.01)

(52) U.S. Cl.
CPC ........ *H04W 16/18* (2013.01); *G06K 9/00637* (2013.01)

(58) Field of Classification Search
None
See application file for complete search history.

(56) References Cited

U.S. PATENT DOCUMENTS

2003/0023412 A1* 1/2003 Rappaport ............ H04W 16/20
                                                                 703/1
2003/0222820 A1* 12/2003 Karr ........................ G01S 1/026
                                                                 342/457

(Continued)

FOREIGN PATENT DOCUMENTS

| JP | 2018-25917 A | 2/2015 |
| KR | 10-1395255 B1 | 5/2014 |
| KR | 10-2019-0038117 A | 4/2019 |

OTHER PUBLICATIONS

Shanghang Zhang et al., Understanding Traffic Density from Large-Scale Web Camera Data, Carnegie Mellon University, Pittsburgh, PA, USA ISR—IST, Uniersidade de Lisboa, Lisboa, Portugal, CVPR paper, 2017, pp. 5898 to 5907.

(Continued)

*Primary Examiner* — Idowu O Osifade
(74) *Attorney, Agent, or Firm* — Jefferson IP Law, LLP

(57) ABSTRACT

An apparatus for processing an image is provided. The apparatus includes at least one processor, and a memory electrically connected to the at least one processor, wherein the memory stores instructions causing the at least one processor to perform a process of identifying a first image and a second image collected in a time series, acquiring first layer information corresponding to a first object from the first image, acquiring second layer information corresponding to a second object from the second image, acquiring a radio propagation parameter based on the first layer information and the second layer information, and acquiring radio frequency design information based on the radio propagation parameter.

20 Claims, 9 Drawing Sheets

(56) References Cited

U.S. PATENT DOCUMENTS

2012/0062419 A1 3/2012 Yoon
2013/0281115 A1* 10/2013 Dupray ................ H04W 4/025
455/456.1
2017/0019797 A1 1/2017 Rubio

OTHER PUBLICATIONS

International Search Report dated Jun. 25, 2019, issued in International Application No. PCT/KR2019/003194.
Danping HE et al. A Novel Method for Radio Propagation Simulation Based on Automatic 3D Environment Reconstruction. Radioengineering, vol. 21, No. 4. Dated Dec. 2012.
Jason M. Cash. Using Light Detection and Ranging (LiDAR) Imagery to Model Radio Wave Propagation. Dated Mar. 20, 2003.
Oestges et al., "Experimental Validation and System Applications of Ray-Tracing Model in Built Up Areas", XP 006014925, Mar. 2, 2000.
European Search Report dated Mar. 23, 2021, issued in European Application No. 19785998.6-1207.

* cited by examiner

METHOD OF PROCESSING IMAGE, COMPUTER-READABLE STORAGE MEDIUM RECORDING METHOD, AND APPARATUS FOR PROCESSING IMAGE

CROSS-REFERENCE TO RELATED APPLICATION(S)

This application is based on and claims priority under 35 U.S.C. § 119(a) of a Korean patent application number 10-2018-0043474, filed on Apr. 13, 2018, in the Korean Intellectual Property Office, the disclosure of which is incorporated by reference herein in its entirety.

BACKGROUND

1. Field

The disclosure relates to a method of processing an image, a computer-readable storage medium recording the method, and an apparatus for processing image.

The disclosure relates to a method of processing an image capable of predicting radio propagation characteristics of a radio environment through a plurality of images acquired in a time series, a computer-readable storage medium recording the method, and an apparatus for processing image.

The disclosure relates to a method of processing an image capable of predicting a network design at a low cost through a satellite image, a computer-readable storage medium recording the method, and an apparatus for processing the image.

2. Description of the Related Art

In order to meet wireless data traffic demands that have increased after 4th Generation (4G) communication system commercialization, efforts to develop an improved 4G communication system or a pre-5th Generation (5G) communication system have been made. For this reason, the improved 4G communication system or the pre-5G communication system is called a beyond 4G network communication system or a post LTE system.

In addition, in order to achieve a high data transmission rate, an implementation of a 5G communication system in an mmWave band (for example, 60 GHz band) is being considered. In the 5G communication system, technologies such as beamforming, massive MIMO, full dimensional MIMO (FD-MIMO), an array antenna, analog beam-forming, and a large scale antenna are being discussed to mitigate a propagation path loss in the mmWave band and increase a propagation transmission distance.

Further, technologies such as an evolved small cell, an advanced small cell, a cloud radio access network (cloud RAN), an ultra-dense network, device to device communication (D2D), a wireless backhaul, a moving network, cooperative communication, coordinated multi-points (CoMP), and interference cancellation have been developed to improve the system network in the 5G communication system.

In addition, the 5G system has developed advanced coding modulation (ACM) schemes such as hybrid FSK and QAM modulation (FQAM) and sliding window superposition coding (SWSC), and advanced access technologies such as filter bank multi carrier (FBMC), non orthogonal multiple access (NOMA), and sparse code multiple access (SCMA).

As described above, it is considered to implement the 5G communication system in an mmWave band (60 GHz) band, and it is required to design a sophisticated network since a radio wavelength is short in the mmWave band.

In order to efficiently arrange base stations in a wireless network design, a propagation path loss may be predicted and a propagation environment may be estimated using the propagation path loss.

A downtown propagation environment has unique values such as arrangement of buildings, a road width, building heights, building materials, and building orientations, and a radio propagation characteristic may vary depending on the various characteristics. In addition, in order to predict the propagation environment, a path loss value, an antenna gain, cable loss, diffraction loss, and morphology loss may be further used.

In a wireless network design, it is required to predict a propagation path to estimate propagation path loss and for the prediction an actual environment map (for example, a three dimensional (3D) map including buildings, trees, and obstacles) is needed. However, implementing the actual environment map at a precise level is expensive.

Meanwhile, it is possible to extract and use data related to geographic features such as buildings and obstacles through image information of a street view, but it takes a lot of time and can be restrictively used only in some areas in which a street view is available.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an image processing method of predicting a radio propagation characteristic of a propagation environment through a plurality of images acquired in a timer series, a computer-readable storage medium recording the method, and an image processing device.

Another aspect of the disclosure is to provide an image processing method of acquiring a plurality of pieces of layer information based on a plurality of images acquired in a time series, a computer-readable storage medium recording the method, and an image processing device.

Another aspect of the disclosure is to provide an image processing method of predicting a radio propagation characteristic of a propagation environment through a plurality of pieces of layer information acquired based on a plurality of images acquired in a timer series and acquire radio frequency design information, a computer-readable storage medium recording the method, and an image processing device.

Another aspect of the disclosure is to provide an image processing method of predicting a radio propagation characteristic of a propagation environment based on information on an overlapping area between a plurality of pieces of layer information and acquire radio frequency design information, a computer-readable storage medium recording the method, and an image processing device.

Another aspect of the disclosure is to provide an image processing method of predicting a radio propagation characteristic of a propagation environment based on object attribute information acquired based on layer information, a computer-readable storage medium recording the method, and an image processing device.

Another aspect of the disclosure is to provide an image processing method of acquiring radio frequency design information based on user equipment (UE) density information acquired based on information on an overlapping area between a plurality of pieces of layer information, a computer-readable storage medium recording the method, and an image processing device.

Additional aspects will be set forth in part in the description which follows and, in part, will be apparent from the description, or may be learned by practice of the presented embodiments.

In accordance with an aspect of the disclosure, an apparatus for processing an image is provided. The apparatus includes at least one processor, and a memory electrically connected to the at least one processor, wherein the memory stores instructions causing the at least one processor to perform a process of, when executed, identifying a first image and a second image collected in a time series, acquiring first layer information corresponding to a first object form the first image, acquiring second layer information corresponding to a second object from the second image, acquiring a radio propagation parameter based on the first layer information and the second layer information, and acquiring radio frequency design information based on the radio propagation parameter.

In accordance with another aspect of the disclosure, a method of processing an image is provided. The method includes identifying a first image and a second image collected in a time series, acquiring first layer information corresponding to a first object from the first image, acquiring second layer information corresponding to a second object from the second image, acquiring a radio propagation parameter based on the first layer information and the second layer information, and acquiring radio frequency design information based on the radio propagation parameter.

In accordance with another aspect of the disclosure, a non-transitory computer-readable storage medium having computer program codes stored therein to perform a method of processing an image when executed by at least one processor is provided. The method includes identifying a first image and a second image collected in a time series, acquiring first layer information corresponding to a first object from the first image, acquiring second layer information corresponding to a second object from the second image, acquiring a radio propagation parameter based on the first layer information and the second layer information, and acquiring radio frequency design information based on the radio propagation parameter.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
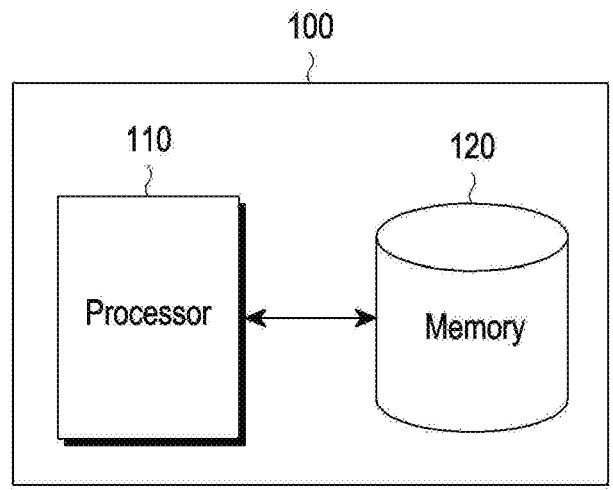
FIG. 1 is a block diagram illustrating an image processing device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" or "module" refers to a software element or a hardware element, such as a field programmable gate array (FPGA) or an application specific integrated circuit (ASIC), which performs a predetermined function. However, the "unit" or "module" does not always have a meaning limited to software or hardware. The "unit" or "module" may be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" may be either combined into a smaller number of elements, "unit", or "module" or divided into a larger number of elements, "unit", or "module". Moreover, the elements and "units" or "modules" may be implemented to reproduce one or more CPUs within a device or a security multimedia card.

The specific terms used herein are provided for ease of understanding the disclosure, and such specific terms may be changed into other forms without departing from the spirit and scope of the disclosure.

FIG. 1 is a block diagram illustrating an image processing device 100 according to an embodiment of the disclosure.

Referring to FIG. 1, the image processing device 100 according to various embodiments may include at least one processor 110 and a memory 120.

Hereinafter, the elements will be sequentially described.

At least one processor 110 according to various embodiments controls the overall operation of the image processing device 100.

The processor 110 according to various embodiments may control at least one other element (for example, a hardware or software element) of the image processing device 100 connected to the processor 110 by driving software (for example, a program) and may perform various data processing and calculations.

The processor 110 according to various embodiments may load instructions or data received from another element (for example, a sensor module or a communication module) to a volatile memory 120, process the loaded instructions or data, and store resultant data in a nonvolatile memory.

The processor 110 according to various embodiments may include a main processor 110 (for example, a central processing unit or an application processor) and an auxiliary processor (for example, a graphic processing unit, an image signal processor, a sensor hub processor, or a communication processor) operating independently from the main processor and additionally or alternatively using lower power than the main processor or specified for a predetermined function. The auxiliary processor may operate separately from the main processor or may be embedded into the main processor.

In this case, the auxiliary processor may control at least some of the functions or states related to at least one of the elements of the image processing device 100 (for example, the display device, the sensor module, or the communication module) in place of the main processor while the main processor is in an inactive (for example, sleep) state or together with the main processor while the main processor is in an active (for example, application execution) state.

For example, the auxiliary processor (for example, the image signal processor or the communication processor) may be implemented as a portion of other elements (for example, the camera module or the communication module)

functionally related thereto. The memory 120 may store various data used by at least one element of the image processing device 100 (for example, the processor 110 or the sensor module), for example, software (for example, a program), and input data or output data on instructions related thereto.

The program may be software stored in the memory 120 and may include, for example, an operating system, middleware, or an application.

The memory 120 according to various embodiments may include volatile memory or nonvolatile memory.

The memory 120 according to various embodiments may store a basic program, an application, and data such as configuration information for the operation of the image processing device 100 to acquire a program, layer information, a radio propagation parameter, and radio frequency design information on processing and controlling by the processor 110.

The memory 120 according to various embodiments may perform a function for temporarily storing input/output data on processing and controlling by the processor 110.

For example, the memory 120 may store input/output data, a satellite image, a still image, a moving image, a preview image, layer information, a radio propagation parameter, and radio frequency design information for processing and controlling by the processor 110.

Further, the memory 120 may store geographic information system (GIS) data including building data such as a building layout in a region in which a wireless network will be designed, a building material, and a building direction, and topographical data such as a road width and coordinates of a centroid in the form of a data base (DB).

For example, a GIS is an aggregate of computer hardware, software, geographic data, and human resources which is organized to efficiently acquire all pieces of geographically arranged tangible information and store, update, mange, analyze, and output the information.

Advantages of the GIS are to create drawings in a required form and with a desired scale based on documents and to perform various types of overall analysis through overlapping or disassembly of layers for each topic. Further, the advantages are to easily perform measurement, search, distance calculation, influence calculation, calculation of an area for each purpose and class, analysis of the calculated result, linkage analysis of drawing documents and visual expression of the effect. The GIS scheme may be used to construct a land information system and an urban information system.

The memory 120 may store radio propagation parameter values according to layer information and radio frequency design information according to the radio propagation parameter values in advance in a DB in the form of data.

The processor 110 according to various embodiments may process a plurality of tasks for a wireless network design based on data stored in the memory 120 by a request from the user.

For example, instructions stored in the memory 120 may control the processor 110 to acquire a radio propagation parameter and radio frequency design information based on a plurality of pieces of layer information and a program acquired using a plurality of images stored in the memory 120.

For example, instructions stored in the memory 120 may control the processor 110 to identify a radio propagation parameter and radio frequency design information stored in the memory 120 based on a plurality of pieces of layer information acquired using a plurality of images stored in the memory 120.

For example, instructions stored in the memory 120 may control the processor 110 to acquire required information related to a network design (for example, layer information, a radio propagation parameter, and radio frequency design information) based on a satellite image stored in the memory 120 and store the information in the DB.

Instructions stored in the memory 120 according to various embodiments may cause the processor 110 to identify a first image and a second image collected in a time series, acquire first layer information corresponding to a first object from the first image, acquire second layer information corresponding to a second object from the second image, acquire a radio propagation parameter based on the first layer information and the second layer information, and acquire radio frequency design information based on a radio propagation parameter.

The first image and the second image according to various embodiments may be satellite images.

For example, the first image may be a satellite image generated by filming a predetermined region in summer and the second image may be a satellite image generated by filming the corresponding region in winter.

The first layer information according to various embodiments may be acquired based on information on a boundary of the first object in the first image and the second layer information may be acquired based on information on a boundary of the second object in the second image.

The first layer information and the second layer information according to various embodiments may be displayed as a first object layer and a second object layer in a third image.

For example, the third image may be one of the first image and the second image and may be an image separate from the first image and the second image.

For example, the first image, the second image, and the third image may be satellite images generated by filming the same region in a time series.

The radio propagation parameter according to various embodiments may include information on an overlapping area between the first layer information and the second layer information.

For example, the information on the overlapping area between the first layer information and the second layer information may include information on an overlapping area between the first object layer and the second object layer displayed together with the third image.

For example, the information on the overlapping area between the first layer information and the second layer information may include information on a ratio of the overlapping area between the first object layer and the second object layer to the area of the second object layer displayed together with the third image.

The radio propagation parameter according to various embodiments may include at least one of a jamming level, a propagation path loss rate, a dielectric permittivity, a diffraction coefficient, and a penetration ratio.

For example, the jamming level, the propagation path loss rate, the dielectric permittivity, the diffraction coefficient, and penetration ratio may be identified based on information on the overlapping area between the first layer information and the second layer information which is an example of the radio propagation parameter.

For example, the jamming level, the propagation path loss rate, the dielectric permittivity, the diffraction coefficient, and penetration ratio according to the information on the overlapping area between the first layer information and the second layer information may be stored in the memory 120 in a form of the DB.

The radio propagation parameter according to various embodiments may further include attribute information of the first object and attribute information of the second object.

For example, the attribute information of the first object may be identified based on the first layer information and attribute information of the second object may be identified based on the second layer information.

For example, attribute information of each object according to each piece of layer information may be stored in the memory 120 in the form of the DB.

The radio propagation parameter according to various embodiments may further include density information of the UE.

For example, the density information of the UE may be identified based on information on the overlapping area between the first layer and the second layer.

For example, the density information of the UE according to the information on the overlapping layer between the first layer information and the second layer information may be stored in the memory 120 in the form of the DB.

The radio frequency design information according to various embodiments may include one or more pieces of information on installation points of the radio frequency and the number of installations.

Although not illustrated, the image processing device 100 according to various embodiments may further include a communication module, an input device, and a display device.

For example, the input device may receive data from the user to design a wireless network and the output device may presents the result of the input by the user and the processing result of the processor 110 to the user.

According to various embodiments, the communication module may support establishment of a wired or wireless communication channel between the image processing device 100 and an external electronic device (for example, an electronic device or a server) and communication through the established communication channel.

For example, the communication module may include one or more communication processors supporting wired communication or wireless communication operated independently from the processor (for example, an application processor).

For example, the communication module may include a wireless communication module (for example, a cellular communication module, a short-range wireless communication module, or a global navigation satellite system (GNSS) communication module) or a wired communication module (for example, a local area network (LAN) communication module or a power-line communication module), and may communicate with an external electronic device through a first network (for example, a short-range communication network such as Bluetooth, Wi-Fi direct, or infrared data association (IrDA)) or a second network (for example, a long-distance communication network such as a cellular network, Internet, or a computer network (for example, a LAN or a WAN)) using one of the communication modules. The above-described types of communication modules may be implemented as a single chip or as individual chips.

The input device according to various embodiments is a device for receiving instructions or data to be used for an element (for example, the processor 110) of the image processing device 100 from the outside of the image processing device 100 (for example, the user) and may include, for example, a microphone, a mouse, or a keyboard.

The display device according to various embodiments is a device for providing visual information to the user of the image processing device 100 and may include, for example, a display, a hologram device, a projector, and a control circuit for controlling the corresponding device. According to an embodiment, the display device may include touch circuitry or a pressure sensor for measuring the intensity of pressure of a touch.

For example, the image processing device 100 according to various embodiments may output first layer information corresponding to the first object acquired from the first image and second layer information corresponding to the second object acquired from the second image to the first object layer and the second object layer together with the third image through the display device.

For example, the image processing device 100 according to various embodiments may display the first layer information and the second layer information as the first object layer and the second object layer in one image.

The display device according to various embodiments outputs information processed by the image processing device 100. For example, the display device may display an image taken or/and received by the image processing device 100, layer information acquired from the image, a user interface (UI), or a graphic user interface (GUI) related to radio frequency design information.

Figure 6:
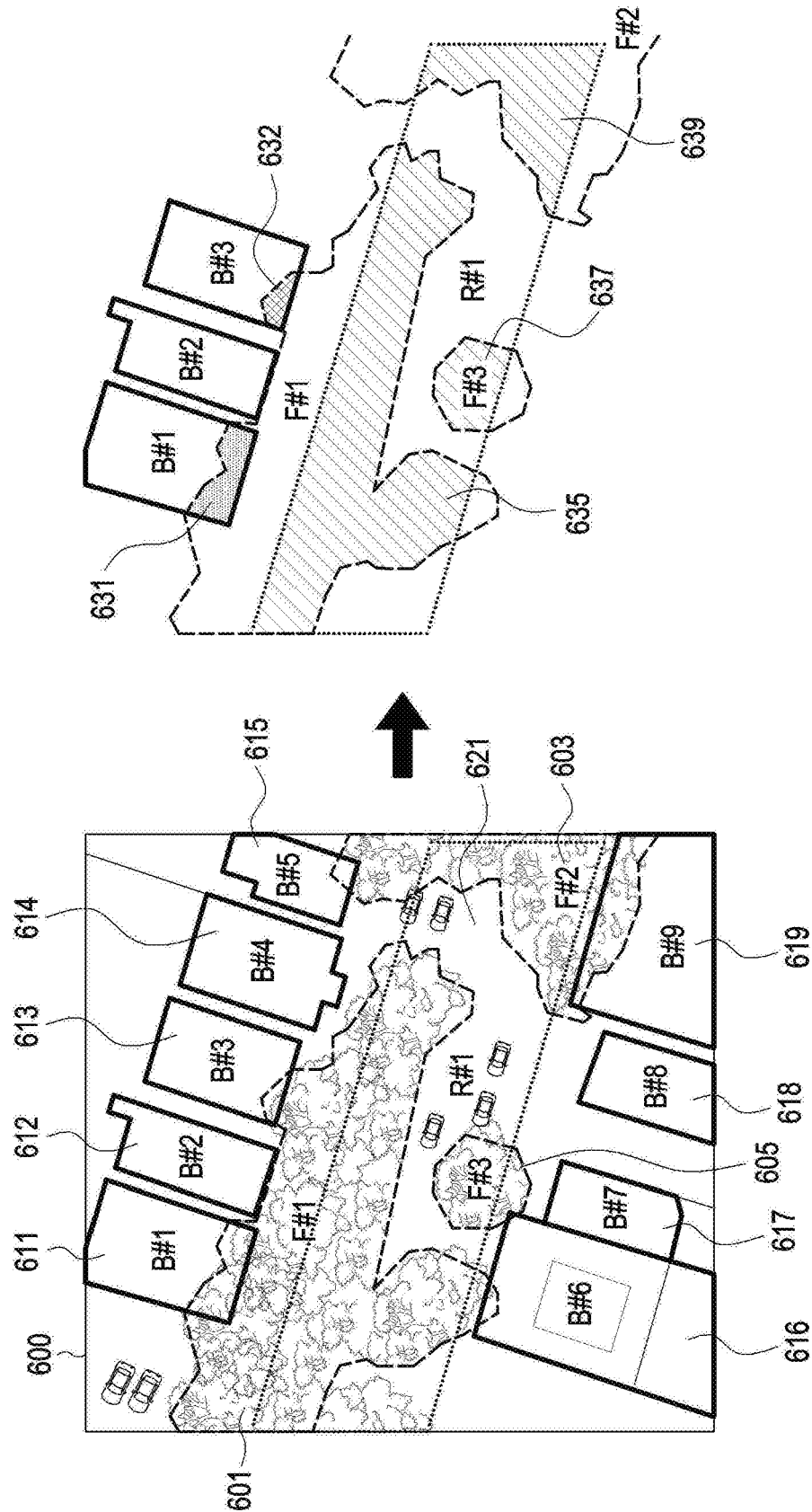
FIG. 6 illustrates an example in which the image processing device outputs a plurality of pieces of layer information acquired using a plurality of images according to an embodiment of the disclosure.
Figure 12:
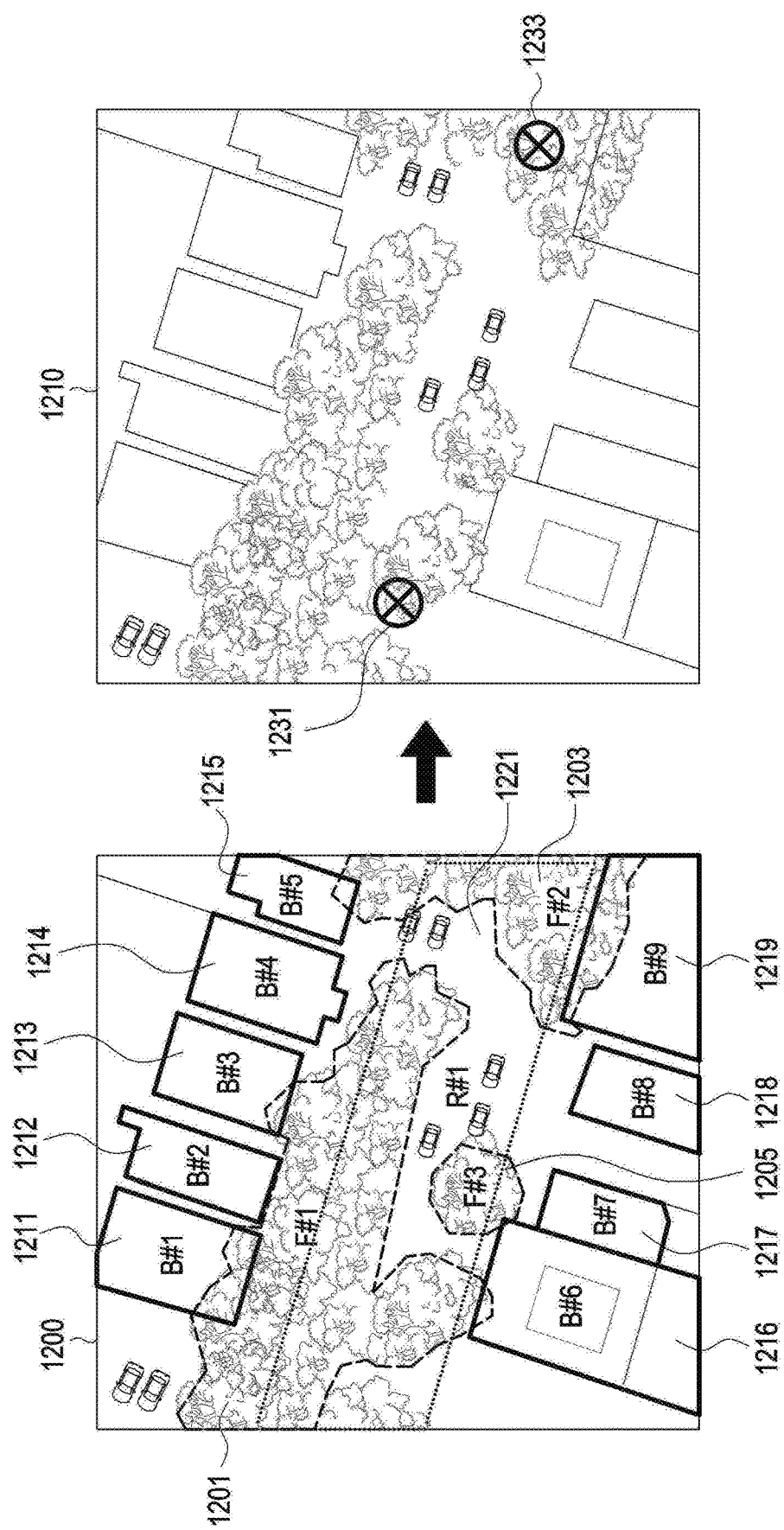
FIG. 12 illustrates an example in which the image processing device acquires radio frequency design information based on plurality of pieces of layer information acquired from a plurality of images according to an embodiment of the disclosure.

For example, the display device may display a plurality of pieces of layer information together as illustrated in FIG. 6, and may display locations and the number of base stations corresponding to radio frequency design information acquired by the image processing device 100 as illustrated in FIG. 12.

Various embodiments described herein may be implemented within a computer-readable recording medium using, for example, software, hardware, or a combination thereof.

According to implementation in hardware, the embodiments described herein may be embodied using at least one of ASICs, digital signal processors (DSPs), digital signal processing devices (DSPDs), programmable logic devices (PLDs), FPGAs, processors 110, controllers, micro-controllers, microprocessors, and electrical units for executing other functions. In some cases, the embodiments may be implemented by the processor 110.

According to implementation in software, embodiments such as procedures or functions may be embodied together with a separate software module for performing at least one function or operation. Software code may be implemented by a software application written by an appropriate program language. Further, software code may be stored in the memory 120 and executed by the processor 110.

Figure 2:
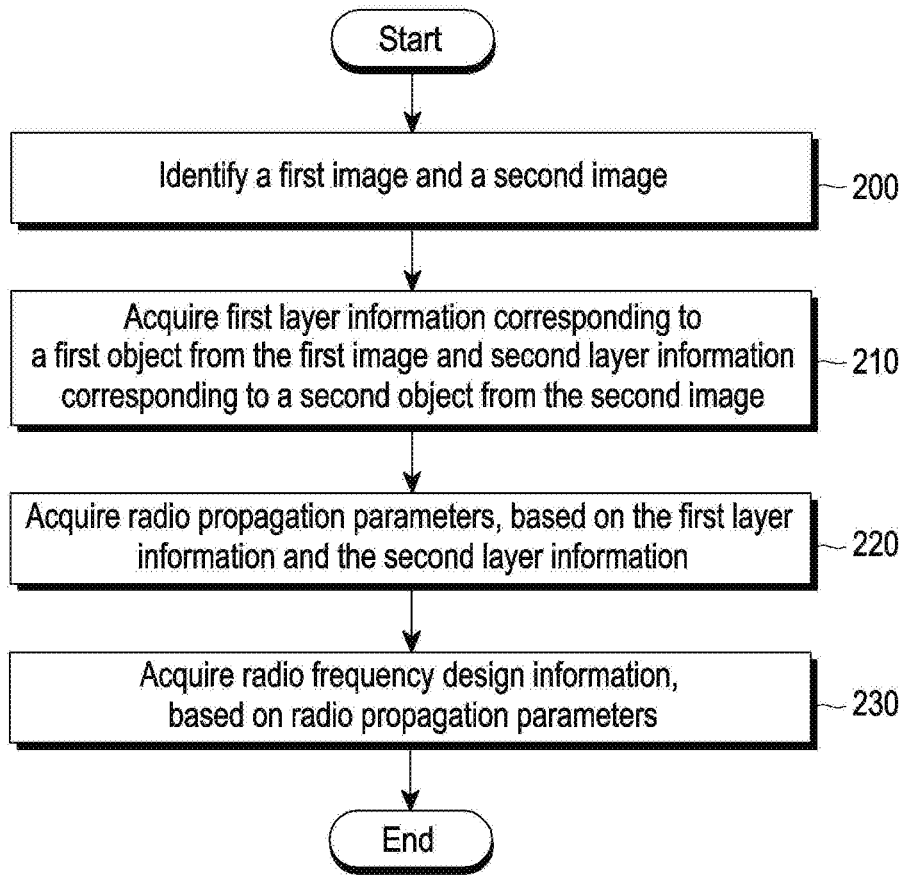
FIG. 2 is a flowchart illustrating the operation in which the image processing device acquires radio frequency design information based on a plurality of images according to an embodiment of the disclosure.

FIG. 2 is a flowchart illustrating the operation in which the image processing device acquires radio frequency design information based on a plurality of images according to an embodiment of the disclosure.

Referring to FIG. 2, in operation 200 the image processing device may identify a first image and a second image in a time series.

The first image and the second image according to various embodiments may be satellite images.

For example, the first image may be a satellite image generated by filming a predetermined region in summer and the second image may be a satellite image generated by filming the same region in winter.

In operation 210, the image processing device may acquire first layer information corresponding to a first object from the first image and acquire second layer information corresponding to a second object from the second image.

For example, layer information may be acquired based on information on a boundary of an object in order to distinguish objects within an image and may be output in an image together with each object. At this time, output layer information may be defined as an object layer within the image.

The image processing device according to various embodiments may acquire layer information corresponding to a plurality of objects from a plurality of images and output the plurality of pieces of acquired layer information together.

In operation 220, the image processing device may acquire a radio propagation parameter based on first layer information and second layer information.

For example, the radio propagation parameter may include at least one piece of information on an overlapping area between the first layer information and the second layer information, a jamming level of foliage of trees located near buildings or roads, a propagation path loss rate, a dielectric permittivity, a diffraction coefficient, a penetration ratio, attribute information of an object, and density information of a UE.

For example, when the first object is foliage and the second object is a building (or road), the information on the overlapping area between the first layer information and the second layer information may be referred to as a foliage overlap ratio in this specification.

In this case, the foliage overlap ratio is information on an overlapping area between a foliage layer and a building layer (or a road layer) and may include information on a ratio of an overlapping area between the foliage layer and the building layer (or the road layer) to an area of the building layer (or the road layer).

For example, a jamming level, a propagation path loss rate, a dielectric permittivity, a diffraction coefficient, a penetration ratio, and a density of the UE may be stored in the memory in the form of a DB.

The radio propagation parameter according to various embodiments may further include attribute information of the first object and attribute information of the second object.

For example, the attribute information of the first object may be identified based on the first layer information and attribute information of the second object may be identified based on the second layer information.

For example, attribute information of each object according to each piece of layer information may be stored in the memory in the form of a DB.

The radio propagation parameter according to various embodiments may further include density information of the UE.

For example, the density information of the UE may be identified based on information on the overlapping area between the first layer and the second layer.

For example, density information of the UE according to the information on the overlapping area between the first layer information and the second layer information may be stored in the memory in the form of a DB.

In operation 230, the image processing device may acquire radio frequency design information based on the radio propagation parameter.

The radio frequency design information according to various embodiments may include one or more pieces of information on a design point of the radio frequency and the number of designed radio frequencies.

FIGS. 3 through 6 illustrate various examples in which the image processing device classifies objects in an image according to various embodiments of the disclosure.

The image classification according to various embodiments may be a task for automatically designating all pixels of the image according to a predetermined number of land covers or topics.

For example, in the image classification according to various embodiments, objects within the image may be classified using an edge detection method.

For example, an edge may correspond to a position at which a brightness of a digital image changes from a low value to a high value or from a high value to a low value and may mean a boundary (=boundary line) between objects included in the digital image.

The edge of the digital image may provide information for identifying objects, recognizing location/shape/size, and detecting directivity.

Within the image, the image processing device according to various embodiments may extract a boundary (boundary line) between objects included in the image through an edge extraction method and classify objects within the image.

Methods of detecting the boundary between objects in the input image may include various methods such as a method by a brightness change using a difference between pixels popularly used in this field and a method using differentiation, so it should be noted that the methods of detecting the boundary line between objects in the input image are not limited to a particular method.

The image according to various embodiments may include a satellite image.

The satellite image according to various embodiments has an advantage in light of accessibility, recency, and periodicity, and thus is highly useful.

For example, it is effective to acquire information of a large space at one time. There is no method of overall detecting the feature and the current status of use of a national land at a look without the use of a satellite.

Further, a satellite image which is a digital form document may be analyzed in an associated and integrated manner with another document and may be accumulated as a time series document.

For example, humanistic territorial resources such as land cover mapping may be quantitatively analyzed using a spectral characteristic of the satellite image and additional information may be extracted by integration with geographic information or using various GIS spatial analysis schemes.

When satellite image data is collected in a time series, change detection and prediction are possible.

An image processing device according to various embodiments may classify artificial geographic features and natural geographic features such as buildings, facility areas, traffic facility areas, and forestlands through satellite images.

For example, items which can be classified using the satellite images may include buildings, facility areas, traffic facility areas, forestlands, farmlands, grasslands, and waters, and when the land use is classified by performing screen-digitizing on a high-definition satellite image, detached houses and apartments may be classified.

When GIS documents and satellite image documents are mixedly used, purposes of the land use reflecting purposes of the land uses subdivided according to human's activity objectives, that is, commercial areas, dwelling areas, business facility areas, and residential and commercial mixing areas may be divided in detail.

Meanwhile, according to an approach, methods may be divided into methods using spectral pattern, spatial pattern, and temporal pattern characteristics.

For example, in spectral classification, a spectral pattern is recognized based on a pixel value to classify objects. That is, objects may be classified in a satellite image through spectral information of each pixel.

In spatial classification, a spatial pattern is recognized based on correlation with neighboring pixels to classify objects. That is, objects may be classified in a satellite image through spatial correlation between the pixel and neighboring pixels. For example, texture of the image, proximity between pixels, and the size, shape, directivity, and repetition of the object may be considered.

In temporal classification, a time is used as a tool for classifying objects. Objects may be identified and classified by detecting a change in a satellite image according to a time.

For example, an object change characteristic according to a time may be detected using a plurality of satellite images shot at different time points such as different seasons and the object change characteristic may be applied to classification.

For example, a paddy field has a distinct characteristic according to a time in that the paddy field is close to a water system in spring, is close to a green area in summer, and is close to a bare ground in winter and thus may be determined through temporal classification.

Figure 3:
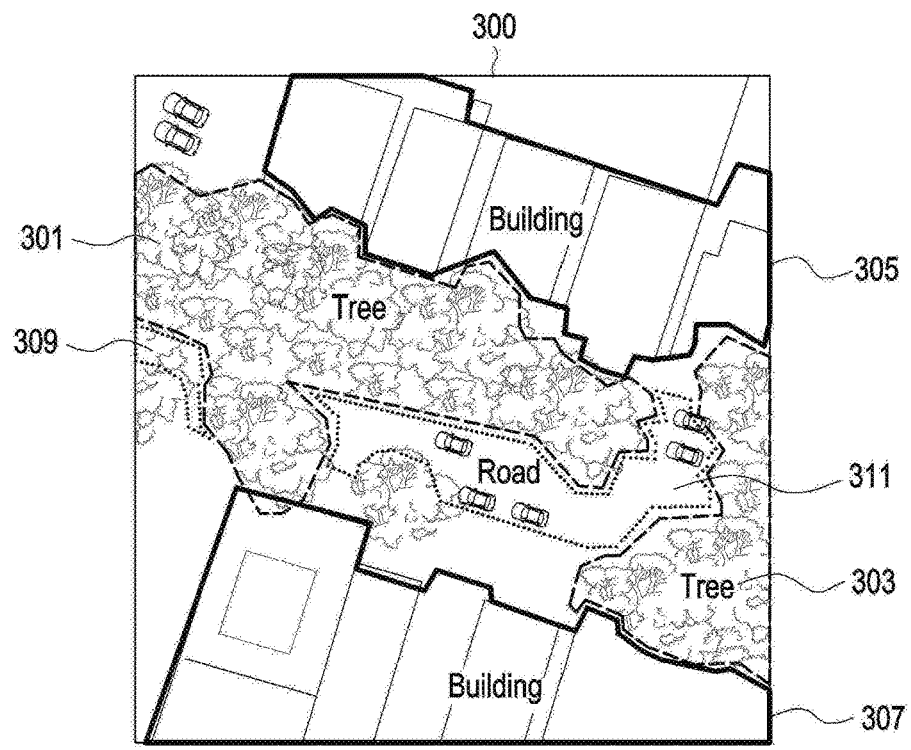
FIG. 3 illustrates an example in which the image processing device extracts a boundary between objects in an image and classifies objects according to an embodiment of the disclosure.

FIG. 3 illustrates an example in which the image processing device extracts a boundary between objects in an image and classifies objects according to various embodiments of the disclosure.

Referring to FIG. 3, buildings 305 and 307, a road 311, and foliage 301, 303, and 309 may be classified in an image 300.

For example, the image processing device according to various embodiments uses methods such as spatial classification and spectral classification in the image and extracts a boundary between object through an image processing method of edge extraction so as to distinguish objects.

Although foliage of trees, buildings, or roads have different heights and buildings or roads are covered with foliage in the actual environment, the foliage 301, 303, and 309 of trees, the buildings 305 and 307, and the road 311 are separated only by boundaries in the image 300 as illustrated in FIG. 3, so that it is difficult to detect boundaries of real shapes of the foliage of trees, the buildings, or the road through image information of the image alone.

More specifically, when the buildings or the road are partially covered with the foliage of the trees, portions of the buildings or the road covered with the foliage of trees are classified as foliage of trees in the image 300 as illustrated in FIG. 3, so that it is difficult to predict the actual environment of geographic features such as the foliage 301, 303, and 309 of trees, the buildings 305 and 307, and the road 311 which are separated only by boundaries in the image 300.

Figure 4:
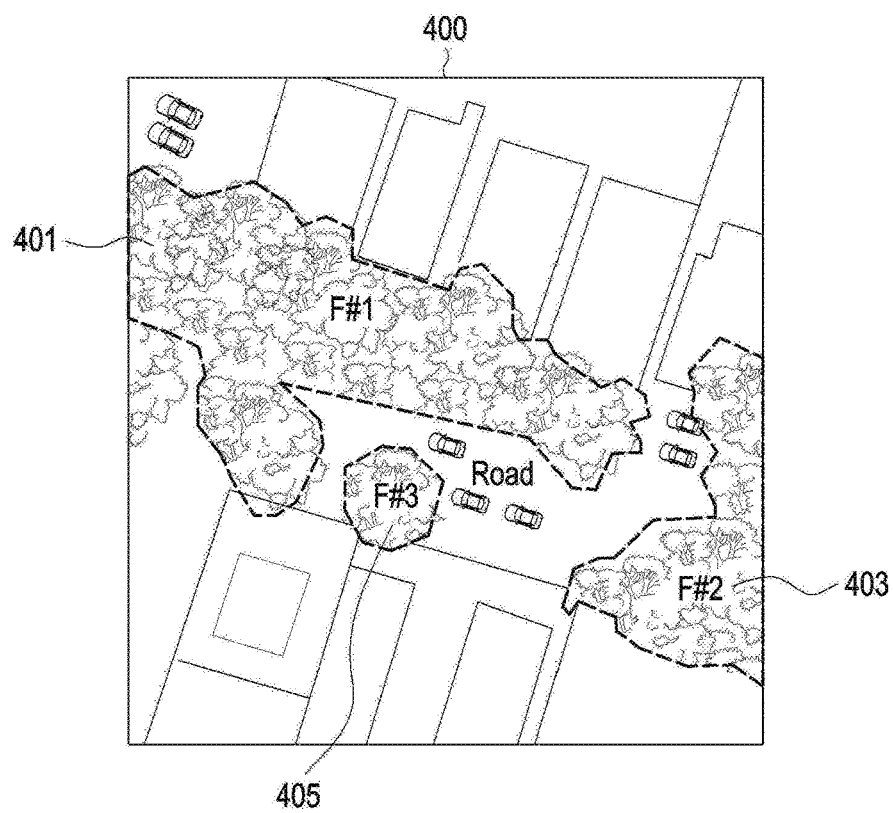
FIGS. 4 and 5 illustrate various embodiments in which the image processing device acquires layer information in order to distinguish objects within an image according to various embodiments of the disclosure.
Figure 5:
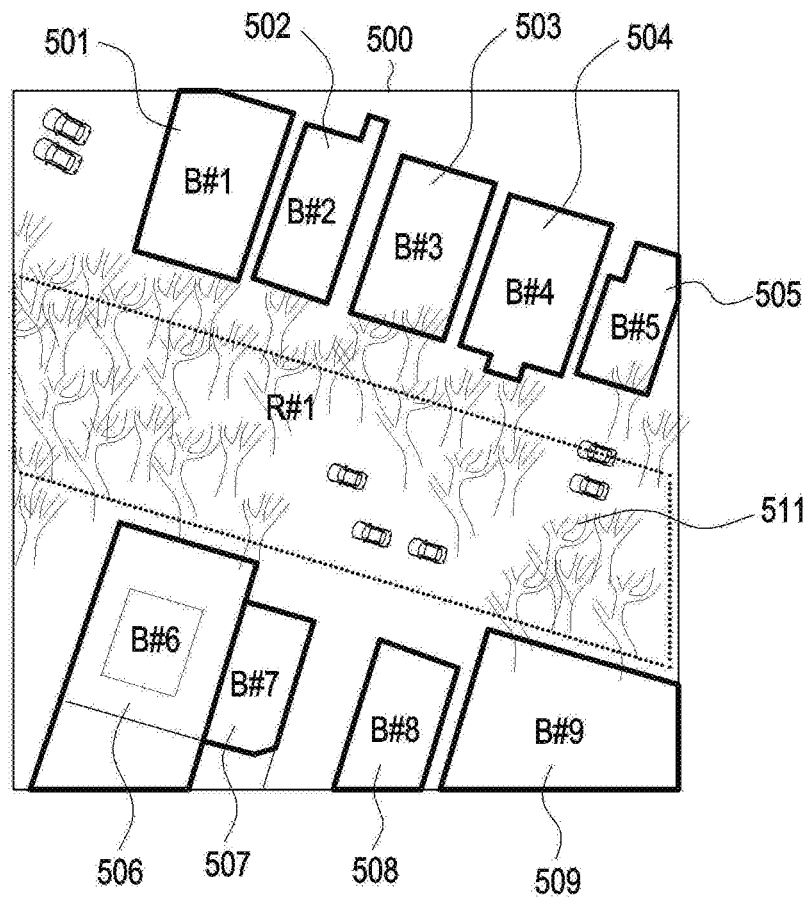

FIGS. 4 and 5 illustrate various embodiments in which the image processing device acquires layer information in order to distinguish objects within an image according to various embodiments of the disclosure.

Layer information according to various embodiments may be acquired based on information on a boundary between objects included in the image.

The image processing device according to various embodiments may output the image such that layer information overlaps objects in order to visually and graphically provide shapes of the objects included in the image to users.

For example, layer information may be output in the image together with each object, and at this time output layer information may be defined as an object layer within the image.

For example, the layer information is acquired based on information on the boundary between objects and thus the object layer may be displayed in accordance with the boundary between objects included within the image.

Attribute information of each object may be acquired based on the layer information according to various embodiments.

For example, attribute information of the object indicates characteristics of geographic features which are objects, and may include a layer code indicating an identifier of the object, object type information, and numerical value information.

For example, the layer information may include layer shape information, and the layer shape information may include shape information of a layer boundary or shape information of the inside of the layer.

For example, the layer code may be acquired based on the shape information of the layer boundary and the object type information or the numerical value information may be acquired based on the shape information of the inside of the layer.

As illustrated in FIGS. 4 through 6, layers codes corresponding to buildings may be indicated by B #1, B #2, B #3, B #4, B #5, B #6, B #7, B #8, and B #9, layer codes corresponding to foliage of trees may be indicated by F #1, F #2, and F #3, and a layer code corresponding to a road may be indicated by R #1.

The image processing device according to various embodiments may acquire a plurality of pieces of layer information corresponding to a plurality of objects based on a plurality of images collected in a time series.

For example, first layer information corresponding to a first object may be acquired form a first image and second layer information corresponding to a second object may be acquired from a second image.

For example, first layer information according to various embodiments may be acquired based on information on a boundary of the first object in the first image and the second layer information may be acquired based on information on a boundary of the second object in the second image.

For example, although buildings or roads are partially covered with foliage of trees, the image processing device according to various embodiments may acquire a plurality of pieces of layer information corresponding to a plurality of objects based on a plurality of images collected in a time series by detecting object change characteristics according to the time and applying the same to classification in order to distinguish objects included in the image as original shapes having separate independent meanings.

In the image according to various embodiments, the boundary of the object extracted from the image may vary depending on foliage change characteristics according to the season.

For example, buildings or roads may be covered with foliage since foliage of trees is opulent in summer, and buildings or roads may not be covered with foliage since trees have no foliage in winter.

Accordingly, due to a foliage change characteristic according to the season, the tree has a distinct characteristic according to a time in that the tree has foliage during summer and has no foliage during winter and the building or the road also has a distinct characteristic according to a time in that the building or the road is covered with foliage of the tree during summer and is not covered with foliage of the tree during winter, so that the foliage of the tree, the building, and the road may be identified as independent entities based on a plurality of images collected in a time series.

For example, it is possible to detect a boundary of foliage of the tree from an image shot during summer in which foliage is opulent based on a foliage change characteristic and to acquire layer information.

More specifically, since the foliage of the tree is opulent in summer as illustrated in FIG. 4, the foliage may be classified based on a multispectral characteristic from the first image 400 shot during summer and first layer information may be acquired based on the boundary of the classified foliage.

The acquired first layer information as illustrated in FIG. 4 may be output as foliage layers 401, 403, and 405 together with the first image 400.

However, since the foliage of the tree covers much of the buildings or the road in the first image 400 shot during summer as illustrated in FIG. 4, it is difficult to identify the buildings or the road included in the first image 400 as independent entities.

The image processing device according to various embodiments may detect a boundary of the buildings or the road from a second image 500 shot during winter in which there is no foliage and acquire second layer information.

Since the tree included in the second image 500 shot during winter has no foliage and thus does not cover buildings or a road as illustrated in FIG. 5, the buildings or the road included in the second image 500 may be classified as independent entities and second layer information may be acquired based on the boundary of the classified buildings or road.

The acquired second layer information may be output as building layers 501, 502, 503, 504, 505, 506, 507, 508, and 509, or a road layer 511 together with the second image 500.

The image processing device according to various embodiments may identify a plurality of objects within the image as independent entities based on the layer information.

FIG. 6 illustrates an example in which the image processing device outputs a plurality of pieces of layer information acquired using a plurality of images according to various embodiments of the disclosure.

Referring to FIG. 6, first layer information and second layer information may be output together with a third image 600.

For example, the third image 600 may be one of the first image 400 of FIG. 4 or the second image 500 of FIG. 5, and may be an image separate from the first image 400 and the second image 500.

For example, the first image 400, the second image 500, and the third image 600 may be satellite images generated by shooting the same area in a time series.

The image processing device according to various embodiments may classify a plurality of objects by displaying a plurality of objects included in the image and object layers together. As illustrated in FIG. 6, foliage layers 601, 603, and 605, building layers 611, 612, 613, 614, 615, 616, 617, 618, and 619, and a road layer 621 may be displayed together with the third image 600 using the first layer information acquired in FIG. 4 and the second layer information acquired in FIG. 5.

Since the foliage layers 601, 603, and 605 may be output based on the first layer information acquired from the first image 400 illustrated in FIG. 4, the building layers 611, 612, 613, 614, 615, 616, 617, 618, and 619 or the road layer 621 may be output based on the second layer information acquired from the second image 500 illustrated in FIG. 5, if the first layer information and the second layer information are output together with the third image 600 as illustrated in FIG. 6, the foliage layer 601 and the building layers 611 and 613 may be overlappingly displayed as independent objects, and the foliage layers 601, 603, and 605 and the road layer 621 may be overlappingly displayed as independent objects.

Accordingly, as illustrated in FIG. 6, portions 631 and 632 of the buildings or portions 635, 637, and 639 of the road covered with foliage of the trees may be identified as portions of the building layers 611 and 613 or the road layer 621 in the third image 600, and it may be predicted how much the foliage of the trees near the buildings or the road cover the buildings or the road in the actual environment based on information on the overlapping portions 631 and 632 between the foliage layer 601 and the building layers 611 and 613 and the overlapping portions 635, 637, and 639 between the foliage layers 601, 603, and 605 and the road layer 621.

Accordingly, the image processing device according to various embodiments may predict the actual environment of geographic feature such as buildings, roads, and foliage of trees through only layer information for each object displayed with the image.

Figure 7:
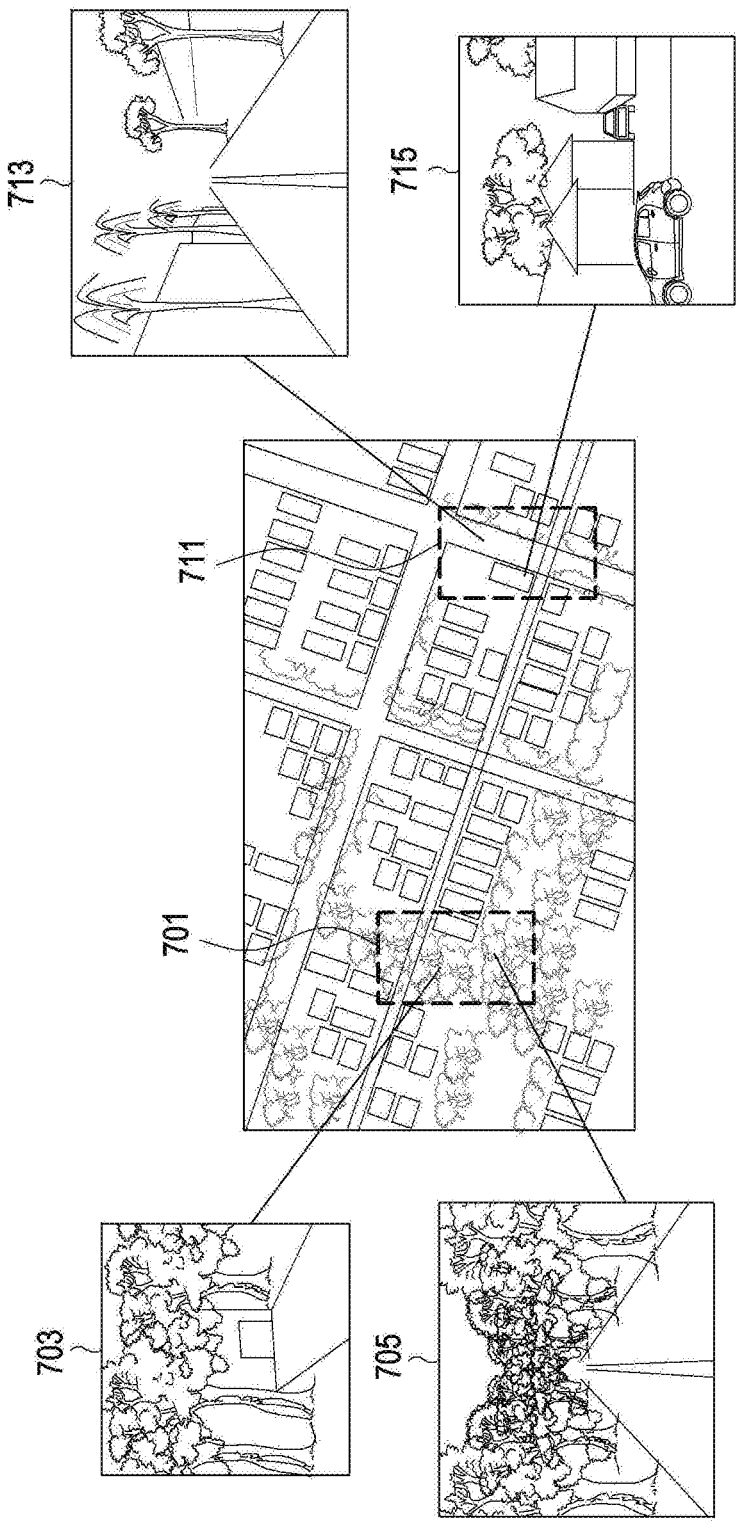
FIG. 7 illustrates a concept in which the image processing device predicts a radio propagation characteristic based on influence of foliage on the propagation characteristic according to an embodiment of the disclosure.

FIG. 7 illustrates a concept on which the image processing device predicts a radio propagation characteristic based on influence of foliage on the propagation characteristic according to an embodiment of the disclosure.

Propagation of waves may be generally described as a physical phenomenon such as reflection, diffraction, and scattering, and the waves may arrive at a receiver along very complex and various propagation path because of diffraction due to various obstacles near the receiver.

For example, the radio propagation characteristic of the propagation environment may vary depending on various characteristics such as arrays of buildings, a road width, a building height, a building material, building orientation, an antenna gain, cable loss, diffraction loss, and morphology loss and may be estimated by predicting the propagation path loss. It is because a most basic thing for determining main parameters such as selection of the location of an evolved node B (eNB), intensity of transmission power, and the size of a service area in designing coverage of the mobile communication system is the propagation path loss.

For example, the path loss generated during propagation of waves spreads out from the eNB, and may be calculated by applying system parameters such as geographic information, distance information, and a frequency to a propagation model.

For example, a method of recognizing the size of the propagation path loss includes field measurement and a propagation loss prediction scheme.

For example, the field measurement has an advantage in that an electric intensity of received waves can be most accurately recognized but has a disadvantage in that measurement should be repeated whenever configuration of the system parameters are changed and thus is inefficient and ineffective.

Meanwhile, the propagation loss prediction scheme is mainly used based on a wave propagation prediction model, in which prediction is performed using a mathematical model expressed as reflection, diffraction, and scattering.

Meanwhile, a frequency of a millimeter wave band may provide a larger amount of information compared to a radio propagation characteristic of 1 to 2 GHz currently used for most mobile communication businesses, but has high path loss by obstacles and thus has difficulty in remote communication and has a serious multipath phenomenon according to diffraction, refraction, and reflection.

Propagation characteristics of mm waves higher than or equal to 6 GHz, particularly, higher than or equal to 10 GHz are vulnerable to influence of rain, have propagation path loss by obstacles such as buildings in downtown due to high straightness of propagation property, and a multipath phenomenon according to diffraction, refraction, and reflection.

Particularly, loss by foliage is important for the mm waves, and the propagation loss may include transmission loss (scattering and absorption loss by foliage and stems) generated when waves pass through the tree, diffraction loss by upper and lateral portions of the tree, and reflection loss by the ground.

Accordingly, in the wireless communication system, foliage near a propagation path may significantly influence a characteristic of received radio waves, and foliage of trees or clump on the propagation path may cause loss and fading (a phenomenon in which intensity of an electric field received by interference of multiple waves in a radio channel temporally varies).

That is, since the influence of foliage on the propagation characteristic is important in the wireless communication system design, it is important to predict how much propagation path loss is generated by foliage of trees or clump when the radio propagation characteristic of the propagation environment is predicted.

Referring to FIG. 7, in actual environments 703 and 705 corresponding to region A 701 which is a sector in which foliage of trees covers buildings or a road in the image, the foliage causes propagation path loss and fading as obstacles interrupting radio propagation and thus it may be determined that the radio propagation characteristic is bad.

That is, when foliage of the trees covers much of the buildings or the road in the image as illustrated in FIG. 7, the foliage is opulent as obstacles interrupting radio propagation, so that it may be predicted that the radio propagation characteristic of the area is bad.

On the other hand, as illustrated in FIG. 7, in actual environments 713 and 715 corresponding to region B 711 which is a sector in which foliage of trees does not cover much of the buildings or a road in the image, there is little foliage as obstacles interrupting radio propagation, so that it may be predicted the radio propagation characteristic is good.

Figure 8:
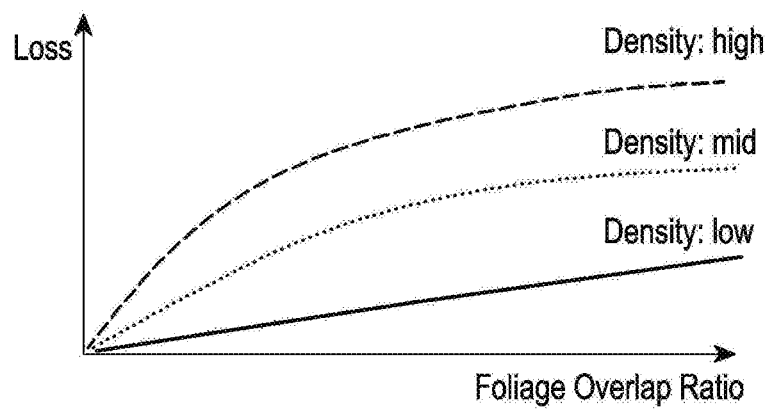
FIGS. 8 and 9 are graphs illustrating a correlation between a plurality of pieces of layer information acquired from a plurality of images by the image processing device and radio propagation parameters for determining a radio propagation characteristic according to various embodiments of the disclosure.
Figure 9:
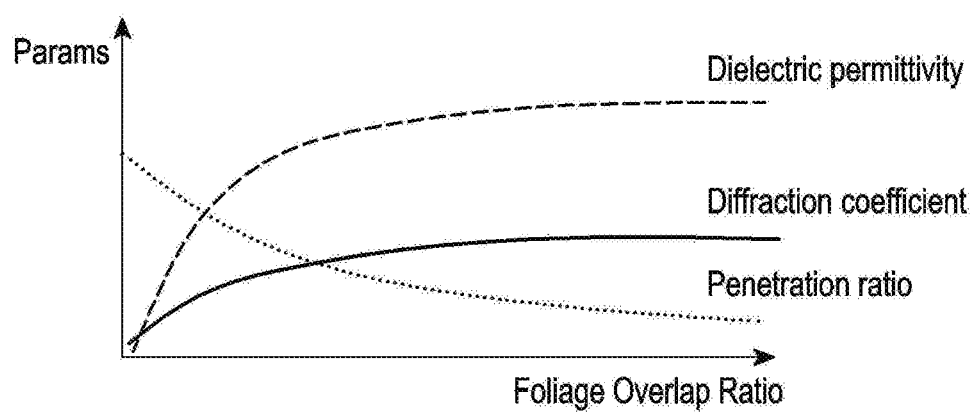

FIGS. 8 and 9 are graphs illustrating a correlation between a plurality of pieces of layer information acquired from a plurality of images by the image processing device and radio propagation parameters for determining a radio propagation characteristic according to various embodiments of the disclosure.

Referring to FIG. 7, since the influence of the foliage on the propagation characteristic is important in the wireless communication system design, it is important to predict how much propagation path loss is generated by the foliage when the radio propagation characteristic of the propagation environment is predicted.

Accordingly, the image processing device according to various embodiments may use information on an overlapping area between first layer information corresponding to foliage of trees and second layer information corresponding to buildings or a road in order to predict how much propagation path loss is generated by foliage of the trees on the buildings or the road.

For example, the image processing device according to various embodiments may use information on an overlapping area between a foliage layer corresponding to the first layer information and a building layer (or a road layer) corresponding to the second layer information, output together with the image as illustrated in FIG. 6 in order to predict how much propagation path loss is generated by foliage of the trees on the buildings or the road.

For example, the information on the overlapping area between the foliage layer and the building layer (or the road layer) is information on a ratio of an overlapping layer between the foliage layer and the building layer (or the road layer) to an area of the building layer (or the road layer) displayed with the image and may be defined as overlap information between the foliage layer and the building layer (or the road layer) or foliage overlap information (foliage overlap ratio) which is an x axis parameter of FIGS. 8 to 9.

The radio propagation parameters according to various embodiments may include at least one of foliage overlap information, a propagation path loss rate, a dielectric permittivity, a diffraction coefficient, and a penetration ratio.

FIG. 8 is a graph illustrating a correlation of a propagation path loss rate according to foliage overlap information and FIG. 9 is a graph illustrating a correlation of a dielectric permittivity, a diffraction coefficient, and a penetration ratio according to foliage overlap information according to various embodiments of the disclosure.

Referring to FIG. 8, as overlap information between the foliage layer and the building layer (or the road layer) displayed with the image is larger, that is, as foliage overlap information (foliage overlap ratio) acquired from the image is larger, the image processing device according to various embodiments may predict that the propagation path loss rate in the actual propagation environment is larger and accordingly the propagation environment is not good.

For example, the high overlap information between the foliage layer and the building layer (or the road layer) means a high ratio of the overlapping area between the foliage layer and the building layer (or the road layer) to the area of the building layer (or the road layer) displayed with the image, which means that a jamming level by the foliage of the trees as obstacles of radio propagation near buildings (or road) is high in the actual propagation environment, so that it may be predicted that the propagation path loss by the foliage is high.

A dielectric permittivity, a diffraction coefficient, and a penetration ratio which are physical metrics influencing the radio propagation may vary depending on overlap information between the foliage layer and the building layer (or the road layer) displayed with the image, that is, foliage overlap information (foliage overlap ratio) acquired from the image.

Referring to FIG. 9, the image processing device according to various embodiments may predict that, as the foliage overlap information is larger, a dielectric permittivity and a diffraction coefficient become larger and a penetration ratio becomes lower.

For example, since the high dielectric permittivity and diffraction coefficient and the low penetration ratio are characteristics that radio waves are not properly transmitted, it may be predicted that the propagation path loss is larger in the actual environment and the propagation environment is not good as the foliage overlap information acquired from the image is larger.

For example, the high overlap information between the foliage layer and the building layer (or the road layer) means a high ratio of the overlapping area between the foliage layer and the building layer (or the road layer) to the area of the building layer (or the road layer) displayed with the image, which means that a jamming level by the foliage of the trees as obstacles of radio propagation near buildings (or road) is high in the actual propagation environment, so that a diffraction coefficient and a dielectric permittivity of the radio wave increase on the propagation path and the penetration ratio of radio waves decreases and thus it may be predicted that the radio propagation characteristic is not good.

Accordingly, the image processing device according to various embodiments may predict the propagation path loss by obstacles such as foliage of trees, buildings, and a road in the actual environment and the radio propagation characteristic of the propagation environment through only image information such as the foliage layer, the building layer, and the road layer displayed with the image and may acquire radio frequency design information based on the predicted radio propagation characteristic.

For example, the image processing device according to various embodiments may acquire radio propagation parameters including at least one of a jamming level of foliage of trees near buildings (or road) in the actual environment, a propagation path loss rate, a dielectric permittivity, a diffraction coefficient, and a penetration ratio based on an overlap ratio between the building layer (or the road layer) and the tree layer displayed with the image, predict the radio propagation environment based on the determined radio propagation parameters, and acquire radio frequency design information according thereto.

For example, the radio frequency design information includes at least one piece of information on installation positions of radio frequencies or number of installations, which will be described in detail with reference to FIGS. 11 and 12.

Figure 10:
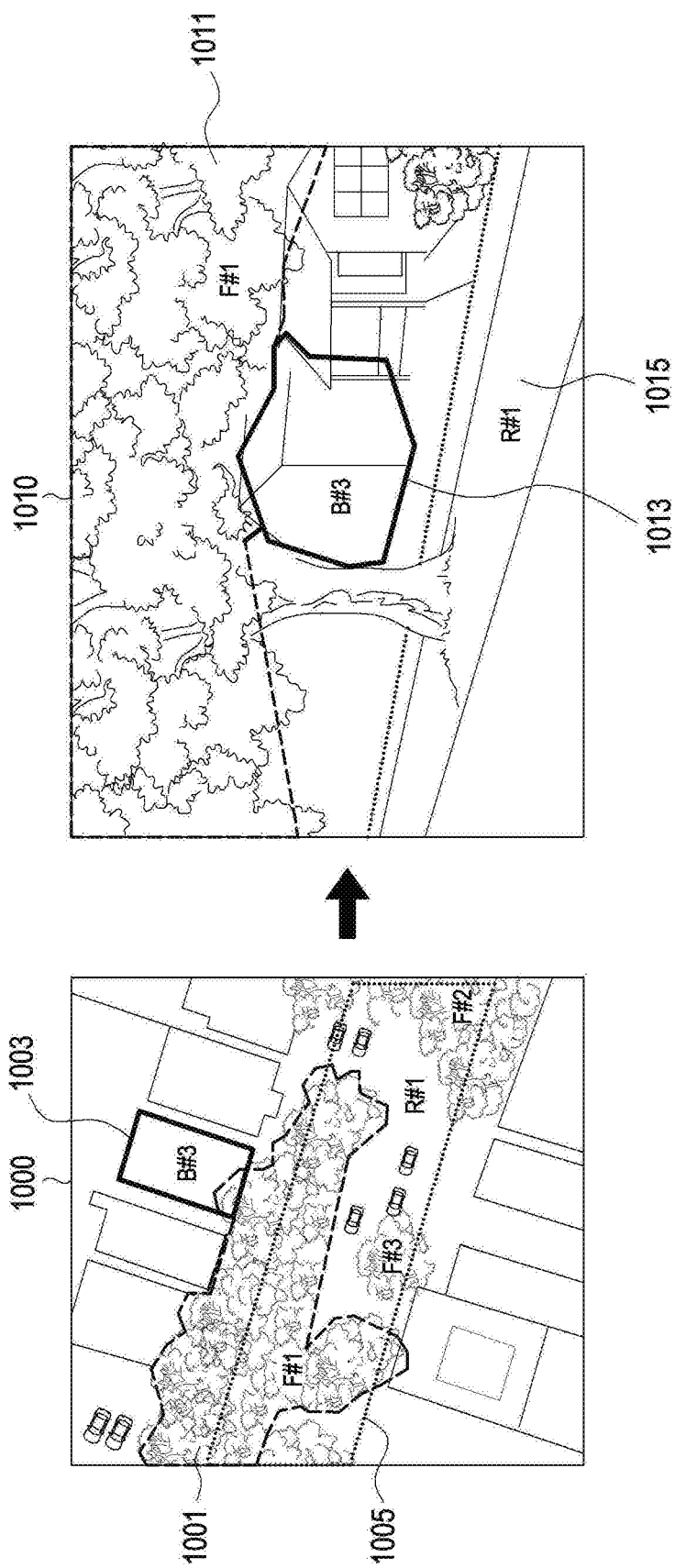
FIG. 10 illustrates an example in which the image processing device acquires radio propagation parameters based on a plurality of pieces of layer information acquired from a plurality of images according to an embodiment of the disclosure.

FIG. 10 illustrates an example in which the image processing device acquires radio propagation parameters based on a plurality of pieces of layer information acquired from a plurality of images according to an embodiment of the disclosure.

The radio propagation parameters according to various embodiments may include at least one of foliage overlap information, a jamming level of foliage of trees near buildings or roads, a propagation path loss rate, a dielectric permittivity, a diffraction coefficient, a penetration ratio, and object attribute information.

Causes influencing the propagation path loss are a radio wave arrival distance, a frequency band, distribution of obstacles in a propagation distance, heights of buildings or obstacles, heights of antennas of the eNB, and a height of a mobile station.

Referring to FIG. 10, the image processing device according to various embodiments may predict how much a corresponding building 1013 (or a road 1015) is covered with foliage 1011 of a corresponding tree in an actual environment 1010 based on an overlapping ratio between a foliage layer 1001 and a building layer 1003 (or a road layer 1005) displayed with an image 1000.

For example, when the overlap ratio between the foliage layer 1001 and the building layer 1003 displayed with the image 1000 is small as illustrated in FIG. 10, it may be predicted that a level at which foliage 1011 of the tree near the building 1013 covers the building 1013 in the actual environment 1010 is low.

Accordingly, it may be predicted that jamming level by the foliage of the tree as a radio propagation obstacle is low, a propagation path loss due to the foliage of the tree is low, and a radio propagation characteristic is good.

For example, when the overlapping ratio between foliage layer 1001 and the road layer 1005 displayed in the image 1000 is intermediate as illustrated in FIG. 10, it may be predicted that a level at which the foliage 1011 of the tree near the road covers the road 1015 in the actual environment 1010 is intermediate. Accordingly, it may be predicted that jamming by the foliage of the tree as the radio propagation obstacle is intermediate and the propagation path loss due to the foliage of the tree is also intermediate in the actual environment 1010.

The image processing device according to various embodiments may acquire object attribute information based on layer information acquired from the image.

For example, the layer information may include layer shape information, and the layer shape information may include shape information of a layer boundary or shape information of the inside of the layer.

For example, attribute information of the object indicates characteristics of geographic features which are objects, and may include a layer code indicating an identifier of the object, object type information, and numerical value information.

For example, the object attribute information indicated by the corresponding layer based on layer information according to various embodiments may be stored in advance in a DB in the form of data.

Layer code according to various embodiments is an identifier of the object indicated by the object layer displayed together with the image and may include information on the object type and index. For example, the layer code corresponding to the building may be expressed as B #n, the layer code corresponding to foliage may be expressed as F #n, and the layer code corresponding to the road may be expressed as R #n (n is a natural number).

The image processing device according to various embodiments may predict the type of the object indicated by the corresponding layer based on layer shape information.

The type of the object indicated by the corresponding layer based on the layer information according to various embodiments may be stored in advance in a DB in the form of data.

For example, the corresponding object indicated by the corresponding layer may be predicted as a building if the shape of a layer boundary is a rectangle, the corresponding object indicated by the corresponding layer may be predicted as a tree, foliage, or a clump if the shape of the layer boundary is a footprint shape, the corresponding object indicated by the corresponding layer may be predicted as a road if the shape of the layer boundary is a rectangle crossing the image.

Object type information according to various embodiments may include information reflecting the purpose of the object. For example, building type information may include information on a single family unit (SFU) or multiple dwelling units (MDUs).

The image processing device according to various embodiments may predict type information of the object indicated by the corresponding layer based on layer shape information.

The type information of the object indicated by the corresponding layer based on layer information according to various embodiments may be stored in advance in a DB in the form of data.

For example, it may be predicted whether a type of the corresponding building indicated by the corresponding layer is the SFU or the MDUs based on information of a roof shape of the building which is the inner shape of the layer.

Dimension information of the object according to various embodiments may include information on at least one of a width or a height of the object.

For example, dimension information of the road may include width information of the road, dimension information of the building may include may include height information of the building, and dimension information of the tree may include height information of the tree.

The image processing device according to various embodiments may predict dimension information of the object indicated by the corresponding layer based on layer shape information.

The dimension information of the object indicated by the corresponding layer based on layer information according to various embodiments may be stored in advance in a DB in the form of data.

For example, the image processing device according to various embodiments of the disclosure may predict that the height of the foliage 1011 of the corresponding tree in the actual environment 1010 is tall based on the overlapping ratio between the foliage layer 1001 and the building layer 1003 displayed with the image 1000 as illustrated in FIG. 10.

Further, the image processing device according to various embodiments may predict that the height of the foliage of the corresponding tree in the actual environment 1010 is taller as an area of the foliage layer 1201 displayed with the image 1000 is larger.

The image processing device according to various embodiments may predict that the width of the corresponding road 1015 in the actual environment 1010 is 20 m based on the shape of the road layer 1005 displayed with the image 1000 as illustrated in FIG. 10.

Further, the image processing device according to various embodiments may predict dimension information of the object indicated by the corresponding layer based on type information of the object.

The dimension information of the object based on the type information of the object according to various embodiments may be stored in advance in a DB in the form of data.

For example, the image processing device according to various embodiments may identify, from a DB stored in a memory, type information and dimension information of the building according to a roof shape of the building based on information of the building layer 1003 (for example, layer shape information) displayed with the image.

For example, the dimension information of the building may be determined based on the type information of the building. For example, it may be identified that height information of the building is 12 m if the type of the building is the SFU and is 20 m if the type of the building is MDUs.

For example, it may be identified that the type of the building is the SFU and the height of the building is 12 m based on information of the roof shape included in the building layer 1003 as illustrated in FIG. 10.

Figure 11:
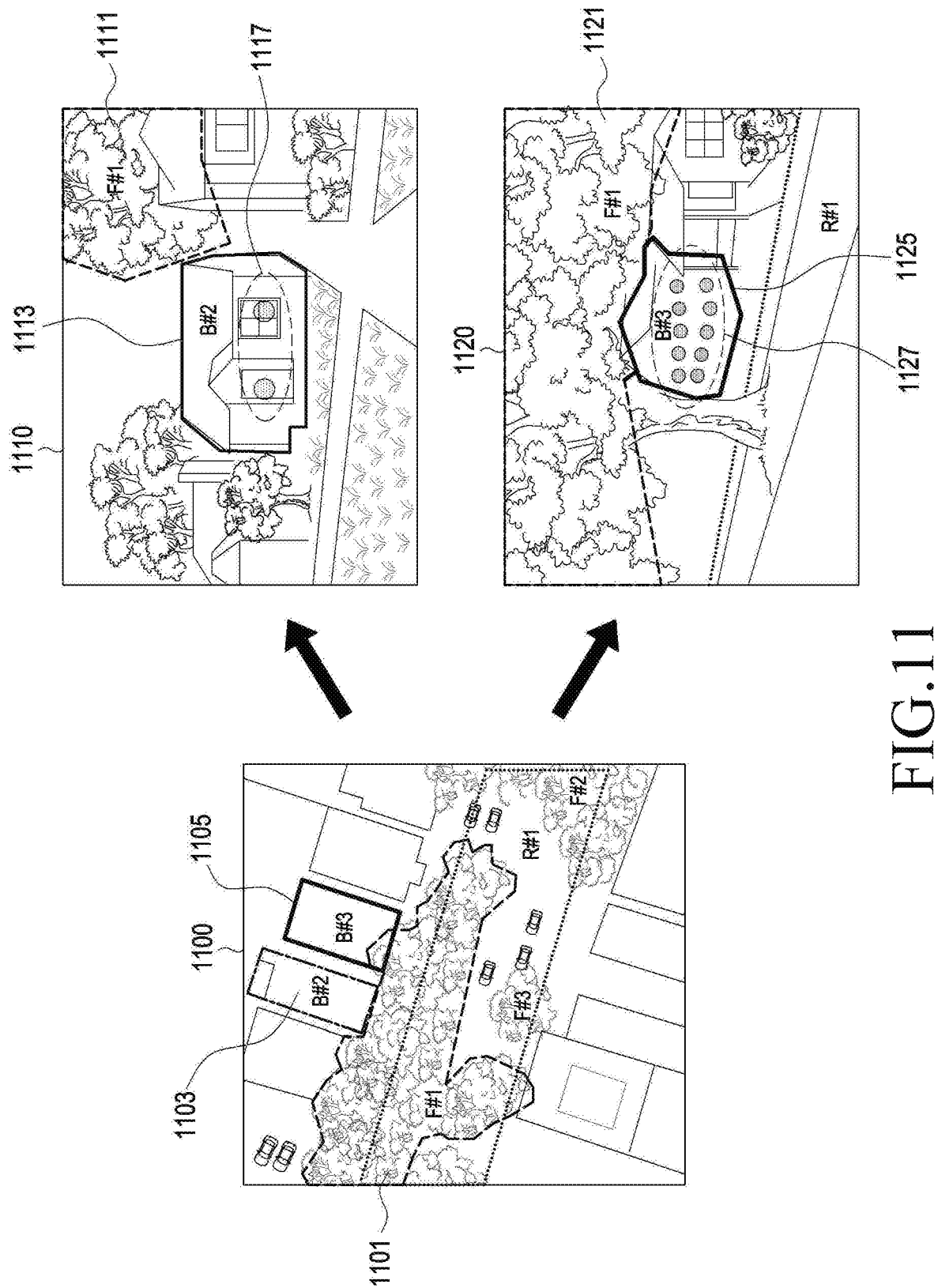
FIG. 11 illustrates an example in which the image processing device configures UE density information based on a plurality of pieces of layer information acquired from a plurality of images according to an embodiment of the disclosure.

FIG. 11 illustrates an example in which the image processing device configures UE density information based on a plurality of pieces of layer information acquired from a plurality of images according to an embodiment of the disclosure.

The radio propagation parameters according to various embodiments may include at least one of foliage overlap information, a jamming level of foliage of trees near buildings or roads, a propagation path loss rate, a dielectric permittivity, a diffraction coefficient, a penetration ratio, object attribute information, and UE density information.

A propagation analysis scheme for efficiently arranging the eNB in a wireless network design system is to determine the optimal location of the eNB by analyzing coverage through propagation analysis for a desired area.

In order to construct a wireless network providing optimal coverage in a downtown micro cell/pico cell and a propagation environment, propagation analysis work should be performed in the wireless network design system using geographic information data such as building data or topographic data of an area in which the wireless network is constructed.

That is, it is necessary to secure an accurate propagation model to design and construct the wireless network. To this end, various propagation models have been used and the most widely used propagation model is an Okumura model-based Hata model.

For example, the Hata model is an equation of the Okumura model for convenience of the use and corresponds to a model used to calculate path loss in the case radio waves are not directly propagated through a free space and arrive at a reception point through repetitive diffraction and reflection from buildings, trees, and hills.

Further, since the Hata model cannot consider all propagation environments, accuracy can be increased using a loss coefficient according to morphology. For example, morphology is a polygon sector formed by a natural environment, topographical characteristics, structure of the house, and arrangement characteristics as a regional characteristic group for designing a wireless network.

Further, since the propagation environment in the downtown has a unique value such as an arrangement of buildings, a road width, a building height, a building material, and a building orientation, a ray-launching scheme is widely used as a propagation analysis method to consider such various characteristics.

The scheme is a ray tracing scheme for calculating intensity of a received radio wave in consideration of an influence of reflection and diffraction experienced by the radio wave until a ray launched from a transmission antenna at a predetermined separation angle arrives at a reception point.

The ray tracing scheme traces a plurality of propagation paths based on radio propagation parameter values which may influence propagation such as building information, the location of a transmission antenna, and an antenna characteristic and estimate whether the plurality of traced propagation paths is reflected and diffracted, so as to calculate attenuation and phases of the plurality of propagation paths and predict propagation path loss information based thereon.

That is, the ray tracing scheme may calculate the propagation loss by calculating the attenuation and phases for propagation on all paths from the transmission antenna to the reception location.

For example, the ray tracing scheme may consider a ground and a building as a dielectric in order to predict the propagation loss near the eNB of the micro cell and apply geographical theory of diffraction/uniform geographical theory of diffraction (GTD/UTD) to find a path along which a reflective wave and a diffracted wave progress and predict the propagation loss.

Accordingly, technical research on a method of search for all reflection points and diffraction points within a propagation analysis radius generated by one ray and determining whether the ray crosses the reception point is actively conducted.

The ray-launching scheme provides a method of further improving a function of the wireless network design system by providing the propagation analysis result for the more accurate downtown propagation environment characteristic compared to a propagation model by measurement and experiment.

In order to consider how much propagation path loss is generated by trees or clump on buildings or roads when the ray-tracing scheme is used, the image processing device according to various embodiments may insert overlap information between the foliage layer and the building layer or overlap information between the foliage layer and the road layer into the radio propagation parameters.

Further, as described above, the ray-tracing scheme may consider the ground and the building as the dielectric in order to predict the propagation loss in which case a dielectric permittivity, a diffraction coefficient, and a penetration ratio may be also inserted into the radio propagation parameters.

Meanwhile, as illustrated in FIG. 9, the dielectric permittivity, the diffraction coefficient, and the penetration ratio which are physical metrics influencing the radio propagation may vary depending on an overlapping ratio between the building layer (or road layer) and the tree layer.

Accordingly, the image processing device according to various embodiments may predict the radio propagation loss through overlap information between the foliage layer and the building layer (or road layer) in the radio propagation parameters.

Meanwhile, in order to construct a wireless network providing optimal coverage, the image processing device according to various embodiments may analyze radio propagation parameters based on geographic information data such as building data or topological data in an area in which the wireless network is constructed and consider not only a radio wave arrival range but also capacity according to eNB capacity and subscriber density to determine an actual service area of the eNB.

For example, the subscriber density indicates a required number of calls and corresponds to UE density. That is, if the cell capacity does not meet the required number of calls even though the radio wave arrival range is determined as cell coverage, there may be an area in which the service cannot be supported, so that it may be required to consider the subscriber density or the UE density corresponding to the required amount of calls of the UE when determining cell coverage.

Further, when the ray-tracing scheme which is the propagation analysis scheme for efficiently arranging the eNB is used, the location and density of the reception point may be relevant to the location and density of the UE.

Meanwhile, the propagation analysis scheme for efficiently arranging the eNB includes various methods such as the ray-tracing scheme commonly used in this field or a scheme using the Hata model, and thus is not limited to a particular method.

The image processing device according to various embodiments may configure subscriber density (UE density) based on the radio propagation characteristic in order to design the wireless network providing optimal coverage.

For example, if the radio propagation characteristic on the radio propagation path is bad, the image processing device according to various embodiments may determine a service area of the eNB by configuring the subscriber density, that is, the UE density to be high on the corresponding radio propagation path.

On the other hand, if the radio propagation characteristic on the radio propagation path is good, the image processing device according to various embodiments may determine a service area of the eNB by configuring the subscriber density, that is, the UE density to be low on the corresponding radio propagation path.

When predicting the radio propagation characteristic on the radio propagation path, the image processing device according to various embodiments may use overlap information between a plurality of layers displayed together with the image.

For example, the image processing device according to various embodiments may predict a jamming level, a propagation loss rate, and a radio propagation characteristic of trees near buildings or roads in the propagation environment based on an overlapping ratio between the building layer and the tree layer or between the road layer and the tree layer displayed with the image.

Accordingly, if the overlapping ratio between the building layer and the tree layer displayed with the image is low, jamming information of the tree near the building in the propagation environment is low, so that the image processing device according to various embodiments may determine that the propagation path loss is low and the radio propagation characteristic is good and accordingly determine the service area of the eNB by configuring the UE density to be low within the corresponding building.

For example, when there is an overlapping area between the foliage layer 1101 and the building layer 1103 displayed with the image 1100 as illustrated in FIG. 11, a jamming level of the foliage 1111 of the tree near the building 1113 as radio propagation obstacles is low in the actual propagation environment 1110, and thus it may be predicted that the propagation path loss is low and the radio propagation characteristic is good.

Accordingly, when there is no overlapping area between the foliage layer 1101 and the building layer 1103 or the overlapping area is small, the radio propagation environment is good. Accordingly, the location 1117 of the UE is configured such that density is sparse within the building 1113 corresponding to the building layer 1103. For example, as illustrated in FIG. 11, the UE density within the building 1113 may be 2 per building.

On the other hand, if the overlapping ratio between the building layer and the tree layer displayed with the image is high, jamming information of the tree near the building in the actual propagation environment is high, so that the image processing device according to various embodiments may determine that the propagation path loss is high and the radio propagation characteristic is bad and accordingly determine the service area of the eNB by configuring the UE density to be high within the corresponding building.

For example, when there is an overlapping area between the foliage layer 1101 and the building layer 1105 displayed with the image 1100 is 25% as illustrated in FIG. 11, a jamming level of the tree 1121 near the building 1125 as radio propagation obstacles is intermediate in the actual propagation environment 1120, and thus it may be predicted that there is the propagation path loss and the radio propagation characteristic is not good.

Accordingly, if the overlapping area between the foliage layer 1101 and the building layer 1105 displayed with the image 1100 is high, the radio propagation environment is not good, and thus the location 1127 of the UE may be configured such that the density is dense within the building 1125 corresponding to the building layer 1105. For example, as illustrated in FIG. 11, the UE density within the building 1125 may be 10 per building.

Accordingly, the image processing device according to various embodiments may insert the overlap information between the foliage layer and the building layer (or road layer) into the radio propagation parameters, predict the radio propagation environment based on overlap information between a plurality of layers, and configure different UE densities within the building or road so as to determine the service area of the eNB.

That is, the image processing device according to various embodiments may configure the UE density based on the radio propagation environment such that all buildings included in the image belong to the service area of the eNB.

The image processing device according to various embodiments may analyze coverage of the eNB based on the radio propagation path loss and UE density information determined based on layer information acquired from the image and determine the optimal number and locations of eNBs based on the analyzed coverage information.

For example, the image processing device according to various embodiments may acquire information on the optimal number and locations of eNBs through UE density information acquired based on overlap information between a plurality of object layers displayed with the image.

Accordingly, the image processing device according to various embodiments may rapidly acquire information on the optimal number and locations of eNBs through only image information of satellite images acquired in a time series.

FIG. 12 illustrates an example in which the image processing device acquires radio frequency design information based on a plurality of pieces of layer information acquired from a plurality of images according to an embodiment of the disclosure.

Referring to FIG. 12, the image processing device according to various embodiments may predict a radio propagation characteristic based on a plurality of object layers displayed with the image and outputs information on the number of eNBs and locations of the eNBs.

For example, causes influencing the propagation path loss may be a radio wave arrival distance, a frequency band, distribution of obstacles in a propagation distance, heights of buildings or obstacles, heights of antennas of the eNB, and a height of a mobile station Further, in order to determine the actual service area of the eNB, not only a radio wave arrival range but also capacity according to eNB capacity and subscriber density may be considered.

Accordingly, the radio propagation parameters according to various embodiments may include at least one of foliage overlap information, a jamming level of foliage of trees near buildings or roads, a propagation path loss rate, a dielectric permittivity, a diffraction coefficient, a penetration ratio, object attribute information, and UE density information.

The radio frequency design information according to various embodiments may include one or more pieces of information on a design point of the radio frequency and the number of designed radio frequencies.

The image processing device according to various embodiments may acquire radio propagation parameters based on a plurality of layers acquired from a plurality of images.

For example, since the influence of foliage of the tree on the propagation characteristic is important in the wireless communication system design as illustrated in FIG. 7, the image processing device according to various embodiments may use foliage overlap information (foliage overlap ratio) acquired from the building layer and the foliage layer displayed with the image in order to predict how much propagation path loss is generated by foliage of the tree or clump on the building or road.

For example, the foliage overlap information (foliage overlap ratio) may include information on a ratio of an area of the building layer (or road layer) overlapping the foliage layer to an area of the building layer (or road layer) displayed with the image.

As illustrated in FIGS. 7 through 11, the image processing device according to various embodiments may predict that, as the foliage overlap information (foliage overlap ratio) acquired based on the overlapping area between the plurality of object layers displayed with the image is larger, a jamming level of the foliage of the tree near the building or road in the actual propagation environment is higher.

Further, the image processing device according to various embodiments may predict that, as an area of the foliage layer displayed with the image is larger, a jamming level of the foliage of the tree in the actual propagation environment is higher.

As illustrated in FIG. 8, as the foliage overlap information (foliage overlap ratio) acquired based on the overlapping area between the plurality of object layers displayed with the image is larger, the image processing device according to various embodiments may predict that the propagation path loss rate is larger and accordingly the propagation environment is not good.

As illustrated in FIG. 9, as the foliage overlap information (foliage overlap ratio) acquired based on the overlapping area between the plurality of object layers displayed with the image is larger, a dielectric permittivity and a diffraction coefficient become larger and a penetration ratio becomes lower, so that the image processing device according to various embodiments cannot transmit radio waves well and thus may predict that the propagation environment is not good.

As illustrated in FIG. 10, the image processing device according to various embodiments may acquire object attribute information based on layer information acquired from the image.

Attribute information of the object indicated by the corresponding layer based on layer information according to various embodiments may be stored in advance in a DB in the form of data.

For example, layer information may include layer shape information displayed with the image and the layer shape information may include layer boundary shape information or inner shape information of the layer.

For example, attribute information of the object indicates characteristics of geographic features which are objects, and may include a layer code indicating an identifier of the object, object type information, and numerical value information.

The image processing device according to various embodiments may predict the type of the object indicated by the corresponding layer, object type information, and object dimension information based on the layer shape information.

For example, the object type may include a building, a road, and foliage of a tree, the object type information may include information on a SFU or MDUs, and the object dimension information may include information on at least one of a width or a height of the object.

For example, the corresponding object indicated by the corresponding layer may be predicted as a building if the shape of a layer boundary is a rectangle, the corresponding object indicated by the corresponding layer may be predicted as a tree, foliage, or a clump if the shape of the layer boundary is a footprint shape, the corresponding object indicated by the corresponding layer may be predicted as a road if the shape of the layer boundary is a rectangle crossing the image.

Layer code according to various embodiments is an identifier of the object indicated by the layer displayed with the image and may include information on the object type and index. For example, the layer code corresponding to the building may be expressed as B #n, the layer code corresponding to foliage may be expressed as F #n, and the layer code corresponding to the road may be expressed as R #n (n is a natural number) as illustrated in FIG. 12.

For example, it may be predicted whether a type of the corresponding building indicated by the corresponding layer is the SFU or the MDUs based on information of a roof shape of the building which is the inner shape of the layer.

For example, the image processing device according to various embodiments may acquire dimension information of the object indicated by the corresponding layer based on the object type information. Height information of the building is 12 m if the building type is the SFU and is 20 m if the building type is the MDUs.

For example, as foliage overlap information (foliage overlap ratio) acquired based on the overlapping area between the plurality of object layers displayed with the image is larger, the image processing device according to various embodiments may predict that the height of foliage of the corresponding tree is taller in the actual environment.

Further, as an area of the foliage layer 1201 displayed with the image 1000 is larger, the image processing device according to various embodiments may predict that the height of the foliage of the corresponding tree in the actual environment 1010 is taller.

In addition, the image processing device according to various embodiments may predict the width of the corresponding road 1015 in the actual environment based on the shape of the road layer 1005 displayed with the image.

As illustrated in FIG. 11, in order to design the wireless network providing optimal coverage, the image processing device according to various embodiments may configure subscriber density (UE density) based on the radio propagation characteristic.

The image processing device according to various embodiments may configure the UE density based on the radio propagation environment such that all buildings included in the satellite image belong to the service area of the eNB.

As illustrated in FIG. 11, as the foliage overlap information (foliage overlap ratio) acquired based on the overlapping area between the plurality of object layers displayed with the image is larger, the image processing device according to various embodiments may predict that the propagation environment is not good and accordingly determine the service area of the eNB by configuring UE density within the corresponding building to be high.

Accordingly, the image processing device according to various embodiments may analyze coverage of the eNB based on the radio propagation path loss determined based on layer information acquired from the image and radio propagation parameters including density information of the UE and determine the optimal number and locations of eNBs based on the analyzed coverage information.

As described above, the image processing device according to various embodiments may acquire the radio propagation parameter values based on a plurality of pieces of layer information acquired from a plurality of images.

For example, the plurality of pieces of layer information may be output together with the image, and foliage layers 1201, 1203, and 1205, building layers 1211, 1212, 1213, 1214, 1215, 1216, 1217, 1218, and 1219, and a road layer 1211 may be displayed together with an image 1200 as illustrated in FIG. 12.

For example, foliage overlap information may be acquired based on information on an overlapping area between the foliage layers 1201, 1203, and 1205, the building layers 1211, 1212, 1213, 1214, 1215, 1216, 1217, 1218, and 1219, and the road layer 1221, displayed together in the image 1200.

The radio propagation parameters according to various embodiments may include at least one of foliage overlap information, a jamming level of foliage of trees near buildings or roads, a propagation path loss rate, a dielectric permittivity, a diffraction coefficient, a penetration ratio, object attribute information, and UE density information.

The image processing device according to various embodiments may acquire a plurality of pieces of layer information from a plurality of images and store radio propagation parameters acquired based on the plurality of pieces of layer information in a DB in the form of a lookup table for each object.

Table 1 is a table showing radio propagation parameter values acquired based on layer information corresponding to buildings, Table 2 is a table showing radio propagation parameter values acquired based on layer information corresponding to a road, and Table 3 is a table showing radio propagation parameter values acquired based on layer information corresponding to foliage of a tree.

TABLE 1

| Building ID | Building Type | Building Height | Foliage Overlap (%) |
|---|---|---|---|
| B#1 | SFU | 12 m | 10% |
| B#2 | SFU | 12 m | 0% |
| B#3 | SFU | 12 m | 25% |
| B#4 | SFU | 15 m | 0% |
| B#5 | SFU | 12 m | 15% |
| B#6 | MDU | 20 m | 5% |
| B#7 | SFU | 12 m | 0% |
| B#8 | SFU | 12 m | 0% |
| B#9 | MDU | 20 m | 20% |

TABLE 2

| Road ID | Road Width | Road Curvature | Foliage Overlap (%) |
|---|---|---|---|
| R#1 | 20 m | 0.4 | 55% |

TABLE 3

| Foliage ID | Foliage Height | Jamming Level ofFoliage |
|---|---|---|
| F#1 | 15 m | Mid |
| F#2 | 15 m | High |
| F#3 | 10 m | Low |

The image processing device according to various embodiments may acquire radio propagation parameter values based on a plurality of pieces of layer information acquired from a plurality of images, predict an actual radio propagation environment based on the acquired radio propagation parameter values, and acquire radio frequency design information based on the predicted radio propagation environment.

For example, the radio frequency design information includes at least one of the proper cell size, an installation location of a radio frequency (eNB), or information on the number of installations, and at least one of the proper cell size, the number of eNBs, or locations of the eNBs may be determined such that all buildings included in the image belong to the service area of the eNB.

For example, the image processing device may predict the actual radio propagation environment based on the radio propagation parameter values shown in Table 1 to Table 3, analyze coverage of the eNB based on the predicted radio propagation environment, and determine the optimal number of eNBs based on the analyzed coverage information.

The image processing device according to various embodiments may predict the actual radio propagation environment in further consideration of the UE density value illustrated in FIG. 11 as well as the radio propagation parameter values shown in Table 1 to Table 3, analyze coverage of the eNB based on the predicted radio propagation environment, and determine the optimal number and locations of eNBs based on the analyzed coverage information.

Further, the image processing device according to various embodiments may analyze morphology within the image based on layer information acquired from the image.

For example, morphology is to determine the land use according to distribution and density of the foliage layers and may increase prediction accuracy of the propagation path loss considering the propagation environment based on a loss coefficient according to the morphology.

For example, the morphology is a polygon sector formed by a natural environment, topographical characteristics, structure of the house, and arrangement characteristics as a regional characteristic group for designing a wireless network.

For example, the image processing device according to various embodiments may increase prediction accuracy of the radio propagation environment in consideration of a density value of the UE or a loss coefficient value according to morphology illustrated in FIG. 11 as well as the radio propagation parameter values shown in Table 1 to Table 3.

The image processing device according to various embodiments may consider, when predicting the radio propagation environment, at least one of radio propagation parameters described in this specification and perform, when considering a plurality of radio propagation parameters, overlapping analysis by assigning different weighted values to the respective radio propagation parameters.

As illustrated in FIG. 12, the image processing device according to various embodiments may output the first layer information acquired from the first image 400 of FIG. 4 and the second layer information acquired from the second image 500 of FIG. 5 together with an third image 1200 and display foliage layers 1201, 1203, and 1205, building layers 1211,1212,1213,1214,1215,1216,1217,1218, and 1219, and a road layer 1221.

As illustrated in FIG. 12, the image processing device according to various embodiments may predict an actual radio propagation environment through radio propagation parameter values including at least one of foliage overlap information, attribute information for each object, a jamming level of foliage, and UE density, acquired based on areas or shapes of the foliage layer, the building layer, and the road layer displayed in the third image 1200, analyze coverage of the eNB based on the predicted radio propagation environment, and acquire the optimal number of eNBs which is 2 and locations 1231 and 1233 of the eNB as illustrated in image 1210 of FIG. 12 based on the analyzed coverage information.

Accordingly, the image processing device according to various embodiments may rapidly acquire radio access design information at a low cost by predicting the actual radio propagation environment based on satellite images generated by collecting a wide area in a time series.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

Although the embodiment has been described in the detailed description of the disclosure, the disclosure may be modified in various forms without departing from the scope of the disclosure. Therefore, the scope of the disclosure should not be defined as being limited to the embodiments, but should be defined by the appended claims and equivalents thereof.

The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. The terms "A or B", "one or more of A and/or B", "A, B, or C", or "one or more of A, B and/or C" may include all possible combinations of them. The expression "a first", "a second", "the first", or "the second" used in various embodiments of the disclosure may modify various components regardless of the order and/or the importance but does not limit the corresponding components. When an element (e.g., first element) is referred to as being "(functionally or communicatively) connected," or "directly coupled" to another element (second element), the element may be connected directly to the other element or connected to the other element through yet another element (e.g., third element).

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. For example, a module may be an ASIC.

Various embodiments of the disclosure may be implemented by software (e.g., program) including instructions stored in machine-readable storage media (e.g., internal memory or external memory). The machine is a device that can call the stored instructions from the storage media and operate according to the called instructions, and may include a terminal (e.g., terminal 1300 of FIG. 13) according to the various embodiments. The instructions, when executed by a processor (e.g., processor 1320 of FIG. 13, processor 1420 of FIG. 14, or processor 1520 of FIG. 15), may cause the processor to directly execute a function corresponding to the instructions or cause other elements to execute the function under the control of the processor. The instruction may include a code that is generated or executed by a compiler or interpreter.

The machine-readable storage media may be provided in the form of non-transitory storage media. Here, the term "non-transitory" only means that the storage media is tangible without including a signal, irrespective of whether data is semi-permanently or transitorily stored in the storage media.

The method according to various embodiments disclosed herein may be included and provided in a computer program product. The computer program product may be traded as a product between a seller and a buyer. The computer program product may be distributed in the form of a machine-readable storage medium (e.g., compact disc read only memory (CD-ROM)), or may be distributed online via an application store (e.g., Play Store™). If distributed online, at least part of the computer program product may be temporarily generated or at least temporarily stored in the machine-readable storage medium, such as memory of the manufacturer's server, a server of the application store, or a relay server.

Each of the elements (e.g., modules or programs) according to various embodiments may include a single entity or multiple entities, and in various embodiments, some sub elements among the above elements may be omitted, or other sub elements may be added. Alternatively or additionally, some elements (e.g., modules or programs) may be integrated into a single element, and the integrated element may still perform the functions performed by each of the corresponding elements in the same or similar manner as before the corresponding elements are integrated. Operations performed by a module, a programming module, or other elements according to various embodiments may be executed sequentially, in parallel, repeatedly, or in a heuristic manner. At least some operations may be executed according to another sequence, may be omitted, or may further include other operations.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An apparatus for processing an image, the apparatus comprising:
at least one processor; and
a memory electrically connected to the at least one processor,
wherein the memory stores instructions causing the at least one processor to perform a process of:
identifying a first image for a region at a first time point and a second image for the region at a second time point,
acquiring first layer information corresponding to a first object in the region from the first image,
acquiring second layer information corresponding to a second object in the region from the second image,
acquiring a radio propagation parameter based on information for the first object and the second object determined to be overlapped according to the first layer information and the second layer information, and
acquiring radio frequency design information based on the radio propagation parameter.

2. The apparatus of claim 1, wherein the first image and the second image are satellite images.

3. The apparatus of claim 1, wherein the first layer information is acquired based on information on a boundary of the first object in the first image and the second layer information is acquired based on information on a boundary of the second object in the second image.

4. The apparatus of claim 1, wherein the first layer information and the second layer information are displayed as a first object layer and a second object layer in a third image.

5. The apparatus of claim 1, wherein the radio propagation parameter includes information on an overlapping area between the first layer information and the second layer information.

6. The apparatus of claim 5,
wherein the radio propagation parameter further includes density information of at least one terminal, and
wherein the density information of the at least one terminal is identified based on the information on the overlapping area between the first layer information and the second layer information.

7. The apparatus of claim 1, wherein the radio propagation parameter includes at least one of a jamming level, a propagation path loss rate, a dielectric permittivity, a diffraction coefficient, or a penetration ratio.

8. The apparatus of claim 1,
wherein the radio propagation parameter further includes attribute information of the first object and attribute information of the second object, and
wherein the attribute information of the first object is identified based on the first layer information, and the attribute information of the second object is identified based on the second layer information.

9. The apparatus of claim 1, wherein the radio frequency design information includes at least one of information on positions of installation of radio frequencies or information on a number of installations of radio frequencies.

10. A method of processing an image, the method comprising:
identifying a first image for a region at a first time point and a second image for the region at a second time point;
acquiring first layer information corresponding to a first object in the region from the first image;
acquiring second layer information corresponding to a second object in the region from the second image;
acquiring a radio propagation parameter based on information for the first object and the second object determined to be overlapped according to the first layer information and the second layer information; and
acquiring radio frequency design information based on the radio propagation parameter.

11. The method of claim 10, wherein the first image and the second image are satellite images.

12. The method of claim 10, wherein the first layer information is acquired based on information on a boundary of the first object in the first image and the second layer information is acquired based on information on a boundary of the second object in the second image.

13. The method of claim 10, wherein the first layer information and the second layer information are displayed as a first object layer and a second object layer in a third image.

14. The method of claim 10, wherein the radio propagation parameter includes information on an overlapping area between the first layer information and the second layer information.

15. The method of claim 14,
wherein the radio propagation parameter further includes density information of at least one terminal, and
wherein the density information of the at least one terminal is identified based on the information on the overlapping area between the first layer information and the second layer information.

16. The method of claim 10, wherein the radio propagation parameter includes at least one of a jamming level, a propagation path loss rate, a dielectric permittivity, a diffraction coefficient, or a penetration ratio.

17. The method of claim 10,
wherein the radio propagation parameter further includes attribute information of the first object and attribute information of the second object, and
wherein the attribute information of the first object is identified based on the first layer information, and the attribute information of the second object is identified based on the second layer information.

18. The method of claim 10, wherein the radio frequency design information includes at least one of information on positions of installation of radio frequencies or information on a number of installations of radio frequencies.

19. A non-transitory computer-readable storage medium having computer program codes stored therein to perform a method of processing an image when executed by at least one processor, the method comprising:
identifying a first image for a region at a first time point and a second image for the region at a second time point;
acquiring first layer information corresponding to a first object from the first image;
acquiring second layer information corresponding to a second object from the second image;
acquiring a radio propagation parameter based on information for the first object and the second object determined to be overlapped according to the first layer information and the second layer information; and
acquiring radio frequency design information based on the radio propagation parameter.

20. The non-transitory computer-readable storage medium of claim 19, wherein the radio propagation parameter includes information on an overlapping area between the first layer information and the second layer information.

* * * * *